(12) United States Patent
Hudson

(10) Patent No.: US 11,506,615 B2
(45) Date of Patent: Nov. 22, 2022

(54) METHOD AND SYSTEM FOR TESTING AND INSPECTING CONTAINERS USING ONE OR MORE LIGHT REFLECTIONS AND POSITIONAL DATA

(71) Applicant: INDUSTRIAL DYNAMICS COMPANY, LTD., Torrance, CA (US)

(72) Inventor: Kendall Hudson, Torrance, CA (US)

(73) Assignee: INDUSTRIAL DYNAMICS COMPANY, LTD, Torrance, CA (US)

( * ) Notice: Subject to any disclaimer, the term of this patent is extended or adjusted under 35 U.S.C. 154(b) by 304 days.

(21) Appl. No.: 16/306,528

(22) PCT Filed: May 31, 2017

(86) PCT No.: PCT/US2017/035303
§ 371 (c)(1),
(2) Date: Nov. 30, 2018

(87) PCT Pub. No.: WO2017/210355
PCT Pub. Date: Dec. 7, 2017

(65) Prior Publication Data
US 2019/0226999 A1      Jul. 25, 2019

Related U.S. Application Data

(60) Provisional application No. 62/343,488, filed on May 31, 2016.

(51) Int. Cl.
*G01B 11/02* (2006.01)
*G01N 21/90* (2006.01)
(Continued)

(52) U.S. Cl.
CPC .......... *G01N 21/909* (2013.01); *G01B 11/02* (2013.01); *G01B 11/04* (2013.01); *G01B 11/22* (2013.01); *G01B 11/24* (2013.01); *G01B 11/28* (2013.01)

(58) Field of Classification Search
CPC ...... G01N 21/909; G01B 11/02; G01B 11/04; G01B 11/22; G01B 11/24; G01B 11/28; (Continued)

(56) References Cited

U.S. PATENT DOCUMENTS 5,072,107 A * 12/1991 Apter ................. G01N 21/9054
250/223 B
5,200,801 A * 4/1993 Juvinall ............. G01N 21/9054
250/223 B
(Continued)

*Primary Examiner* — Roy M Punnoose
(74) *Attorney, Agent, or Firm* — Howard M. Gitten; Lewis Brisbois Bisgaard & Smith, LLP

(57) ABSTRACT

A system is described for inspecting a container having a top surface using light reflections and positional data. The system comprises a radiation source arranged such that the light beam projects radiation onto the top surface, wherein the radiation radiates along the outer edge of the container; a sensor, wherein the radiation is collected by the sensor reflected from the container using positional data, wherein the positional data is used to create a reference plane of the top of the top surface; and a processor operatively connected to the sensor, the processor integrates the positional data to detect defects in the container and creates a reference plane of a top surface of the container, wherein sensor captures the positional data of the container as the container moves on the conveyor; and the positional data is integrated using software to produce a 3D topographical map of the container.

12 Claims, 10 Drawing Sheets

(51) Int. Cl.
*G01B 11/22* (2006.01)
*G01B 11/24* (2006.01)
*G01B 11/04* (2006.01)
*G01B 11/28* (2006.01)

(58) Field of Classification Search
CPC ........ B65B 57/00; B65B 7/2857; G01M 3/36; G01M 3/38
USPC .................................. 356/240.1, 239.4, 612
See application file for complete search history.

(56) References Cited

U.S. PATENT DOCUMENTS

| | | | | |
|---|---|---|---|---|
| 5,592,286 | A * | 1/1997 | Fedor | G01N 21/9054 250/223 B |
| 5,699,152 | A * | 12/1997 | Fedor | G01N 21/909 356/240.1 |
| 6,967,319 | B2 * | 11/2005 | Schmidt | B07C 5/122 209/526 |
| 10,184,900 | B2 * | 1/2019 | Leconte | G01N 21/9054 |
| 10,393,670 | B1 * | 8/2019 | Sones | G01N 21/90 |
| 2004/0150815 | A1 * | 8/2004 | Sones | G01N 21/9054 356/239.4 |
| 2014/0268123 | A1 * | 9/2014 | Juvinall | G01N 21/9081 356/239.4 |
| 2018/0172603 | A1 * | 6/2018 | Piana | G01N 21/9009 |

\* cited by examiner

Collecting one or more representations of the container surface top -- 200

▼

Creating a topographical map of the top of the container surface using the outer edge of the container -- 210

▼

Integrating the one or more representations using positional data of the container in the representations -- 220

▼

Creating a reference plane representing the container surface top using the representations -- 230

▼

Measuring the height from the plane at a spot on the container surface top from the reference plane -- 240

▼

Detecting a defect in the container by comparing the height to a profile, wherein a deviation between the height and the profile indicates the defect -- 250

FIG. 6

METHOD AND SYSTEM FOR TESTING AND INSPECTING CONTAINERS USING ONE OR MORE LIGHT REFLECTIONS AND POSITIONAL DATA

CROSS-REFERENCE TO RELATED APPLICATIONS

This application claims priority to and the benefit of U.S. Provisional Patent Application No. 62/343,488, filed May 31, 2016, the entire disclosure of which is hereby incorporated herein by reference.

TECHNICAL FIELD

This application relates to a method and system for detecting defective containers (e.g., cans and similar containers). More specifically, the application relates to testing and inspecting containers using one or more of light reflections and positional data.

BACKGROUND

Container inspection machines, particularly also when configured as filling machines for filling bottles or similar containers with a liquid filling material, are known in the industry. During the filling process and sealing process, the seal or cap may be defective. Techniques for determining defects are not adequate.

For example, a typical 2D profile from an inspection system is shown in FIGS. 1A and 1B. FIG. 1A shows the correct measurement of positional data of the container surface, and FIG. 1B shows incorrect measurements of the positional data of the container surface. As can be seen from the two images or representations, a single line 120 scan is susceptible to positional errors at the instant of data capture, that is, the single line 120 may not capture the center of the container as shown in FIG. 1B. In which case, the container can be found erroneously to be defective or acceptable when the container is out of position by small amounts during inspection process on the conveyor line. In other words, the container can be found to be defective or accepted falsely for no other reason than the container is out of position by small amounts at the time of inspection.

Accordingly, there is a need for improved methods and systems for inspecting containers. It is to this need, among others, that this application is directed.

SUMMARY

The application provides an inspection method and system for detecting defects in containers and determining whether such containers have variations, defects or other imperfections.

In one embodiment, a system inspects a container having a top surface using light reflections and positional data. The system comprises a radiation source arranged such that the light beam projects radiation onto the top surface, wherein the radiation radiates along the outer edge of the container; a sensor, wherein the radiation is collected by the sensor reflected from the container using positional data, wherein the positional data is used to create a reference plane of the top of the top surface; and a processor operatively connected to the sensor, the processor integrates the positional data to detect defects in the container and creates a reference plane of a top surface of the container, wherein sensor captures the positional data of the container as the container moves on the conveyor; and the positional data is integrated using software to produce a 3D topographical map of the container.

In one embodiment, an inspection system comprises a radiation source or laser scanner, a sensor (e.g., an optical-camera sensor), and a processor or image processor. The laser scanner can be arranged such that the light beams project onto the container surface. In one example, the optical-camera sensor generates digital images or representations of the container surface. Positional data of the container is transmitted to the processor which is connected to the optical-camera sensor, and the defect processor integrates the positional data to determine whether there are variations, defects or other imperfections.

In another embodiment, a system for inspecting a container uses light reflections and positional data. The system includes a laser scanner including a light beam, the laser scanner is arranged such that the light beam projects a light beam onto the container, an optical-camera sensor, wherein the light beam illuminates the container and reflects to the optical-camera sensor, the optical-camera sensor generates of profile data of the container using positional data; and a processor operatively connected to the optical-camera sensor, the processor integrates profile data to detect defects in the container wherein sensor captures the profile data of the container as the container moves on the conveyor; and the profile data is integrated using software to produce a 3D topographical map of the container.

In another embodiment, the container passes under the laser scanner and the camera captures a series of line profiles which exhibit features and/or overlays, and which are integrated by the processor. The processor is a computer using software that analyzes the images or representations to determine variations, defects or other imperfections on the container.

In another embodiment, a method for reducing false positives or false negatives while inspecting a container having a container surface, includes collecting one or more images or representations of the container surface, creating a topographical map of the top of the container surface, integrating the one or more images or representations using positional data of the container in the images or representations, and detecting a defect in the container while correcting or discounting extraneous features of the container surface.

In another embodiment, a method and system can identify pressure and/or vacuum defects in sealed beverage and food containers. The inspection processing system and method detects a first edge i.e., outermost edges, which represents the outermost/largest diameter of the container. Then, the system calculates a circular overlay to fit the largest diameter, which establishes the true position of the container independent of the expected position of the container as it passing on a conveyor or line. A reference plane is developed around the largest diameter and the circular overlay, and is the base height. Once the circular overlay is established, a calculation of and measurement at the "true center" from the positional data is obtained. The height within the central area of interest is used to calculate the height at the center relative to the reference plane. The resulting height indicates adequate or inadequate pressure or vacuum in the sealed beverage and food containers. The derived height may then be compared to a standard to indicate a defect or lack of a defect.

In another embodiment, the top view of a container can be examined using another exemplary method and system for identifying pressure and/or vacuum defects in a container that has, e.g., a non-uniform outer edge. A reference plane may be developed using data within a containers edges. In this example, the first edges or the outermost edges are detected from the cap using the general or approximate exterior edge (e.g., using a "blob"-type of analysis) of the cap. Some or all of the data may be used construct a reference plane, which can be used from vacuum or pressure analysis.

In another embodiment, a method for reducing false positives or false negatives while inspecting a container having a container surface includes the steps of collecting one or more representations of the container surface top; creating a topographical map of the top of the container surface using the outer edge of the container; integrating the one or more representations using positional data of the container in the representations; creating a reference plane representing the container surface top using the representations; measuring the height from the plane at a spot on the container surface top from the reference plane; detecting a defect in the container while correcting or discounting extraneous features of the container surface with respect to position of the container and by comparing the height to an optimal profile. A deviation between the height and the optimal profile indicates a defect.

Other features and advantages of the present application will become apparent from following specification taken in conjunction with the enclosed drawings.

BRIEF DESCRIPTION OF THE DRAWINGS

This application will be described with reference to the following drawings. The drawings and the associated descriptions are provided to illustrate embodiments of the invention and not to limit the scope of the invention:

FIG. 6 illustrates an exemplary method.

DETAILED DESCRIPTION

The application provides a method and system for inspecting or detecting defects (e.g., variations, leaks, and/or excess pressure) in containers, e.g., cans and bottles. Such methods and systems can provide reliable detection of leaks and defects without substantially disturbing the container flow along an inspection line or conveyor line. Specific embodiments now will be described more fully hereinafter with reference to the accompanying drawings, in which some, but not all embodiments are shown.

One illustrative embodiment provides a method and system for identifying pressure and/or vacuum defects or variations. This embodiment may identify a defect in pressure or vacuum in sealed beverage and food containers. This method or system measures pressure or vacuum outside of a single profile in a manner which is less subject to misalignment and potential for false passes or false failures. This embodiment may also be used to identify vacuum defects formed by hot-filled jars and cans or bottle caps and crowns under pressure or vacuum.

Figure 1A:
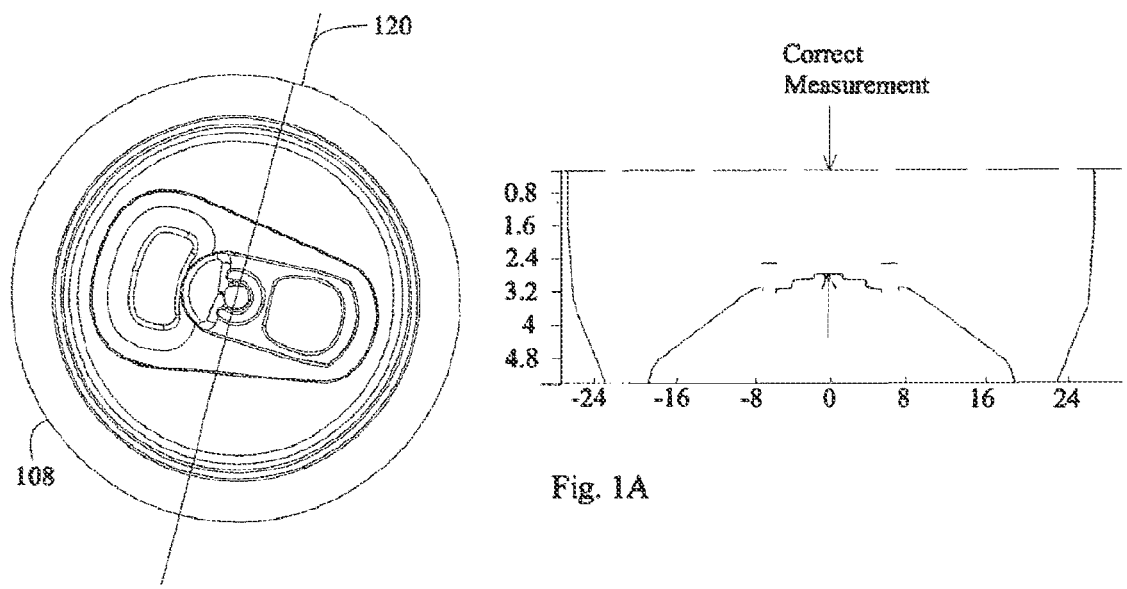
FIG. 1A shows a container that exhibits features with correct measurement using a prior art technique.
Figure 1B:
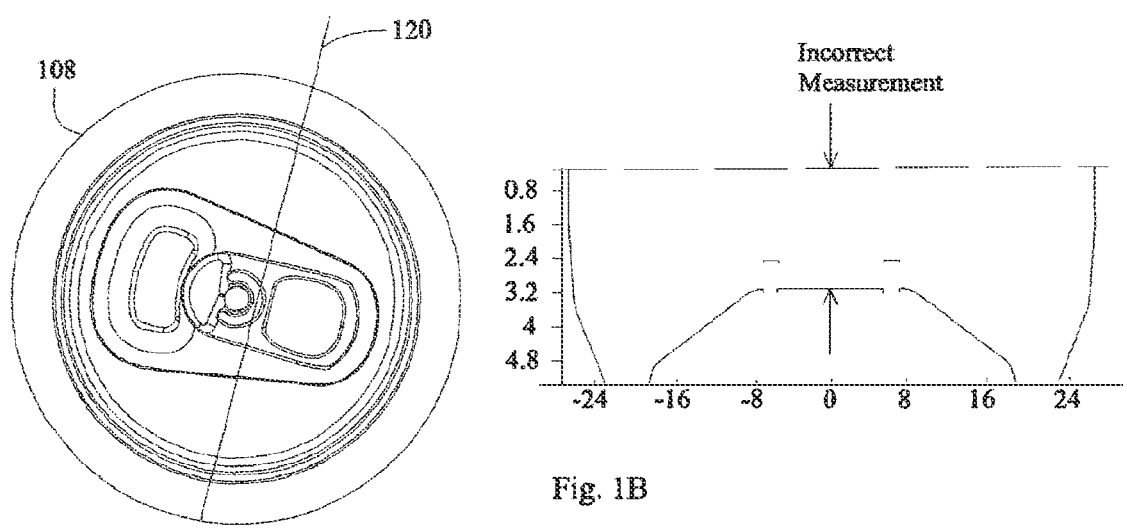
FIG. 1B shows a container that exhibits features with incorrect measurement using a prior art technique.
Figure 2A:
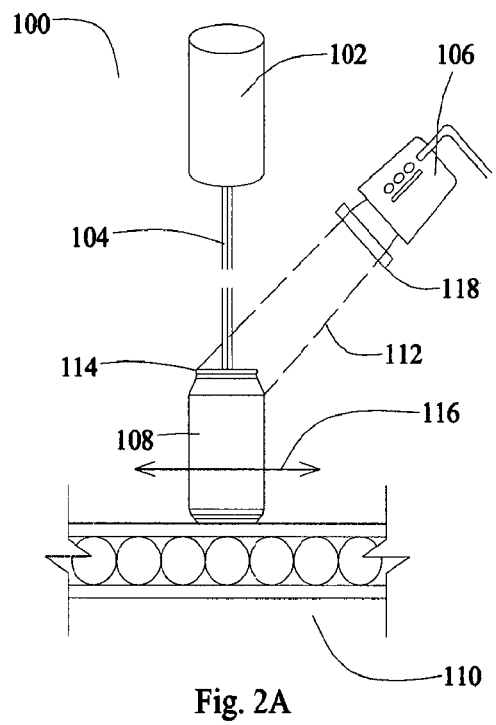
FIG. 2A shows an illustration of an exemplary method and system for testing and inspecting containers in accordance with an embodiment of the present invention.
Figure 2B:
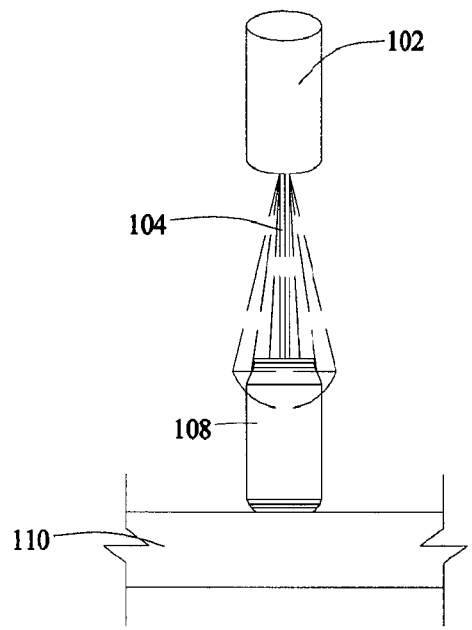
FIG. 2B shows a side view of the exemplary system for testing and inspecting containers in accordance with an embodiment of the present invention.

Referring now to FIG. 2A and FIG. 2B, the inspection system 100 in an exemplary basic or general system 100 includes a radiation source or a laser scanner 102 that illuminates one or more light beams 104 and one or more optical-camera sensors 106, which may include cameras. FIG. 2A and FIG. 2B show two ninety-degree angle rotationally different side views of the projected single light beam 104 in this exemplary implementation. The containers 108 (e.g., beverage cans) flow past the inspection system 100 on a conveyor 110, which may cause container 108 to shift along the conveyor 110. The shift may be due to speed changes, excess conveyor lubricant, guiderail friction, etc. In this example, one or more light beams 104, which can be positionally different with respect to the passing container 108, illuminate or radiate the top of the container 108 and reflects light 112 back to the camera. The optical-camera sensor 106 may be connected to a processor or computer (not shown). The container 108 passes under the laser scanner 102, and the camera captures a series of line profiles and/or overlays, which are then integrated by a processor.

The data from the container 108 can be transmitted to the processor, which can integrate the data and determine whether there are variations, defects or other imperfections in the container 108. In one example, the data can be used to construct the dimension at the approximate "center" of the top of the container 108, while correcting or discounting any extraneous features of the container 108 such as the pull-tab opening mechanism. The height or depth at the center of the container 108 can indicate imperfections or defects in the container 108, including pressure/vacuum defects. Container 108 with such types of variations can be rejected along the line. With the multiple measurements to correct for container features (e.g., tab alignment, rivet diameter, dented chines, and/or container positional variance), the number of false positives can be reduced substantially. The scanned data can be used to detect and characterize features or conditions of the container 108 such as pull-tab presence, pull-tab position, rivet diameter, and dented chines for purposes of further inspection and evaluation. Within the scope of pressure measurements, there can be allowances for compensation input (e.g., carbonated pressure variations) to the algorithm by external sensors for temperature and/or atmospheric pressure changes.

The system can include use of a single line scanner to create several images or representations, which can be captured as the can moves through the scanned area. Light beams 104 are projected onto the top 114 of the container 108 arranged thereon in vertical columns or lines. Individual columns or lines with the correspondingly arranged light beams 104 can be operated independently of one another. The light beams 104 can be generated variably as a function of the surface properties of the container 108. Each individual image can then assembled or integrated using software to produce a 3D topographical map of the surface of the container.

Figure 3A:
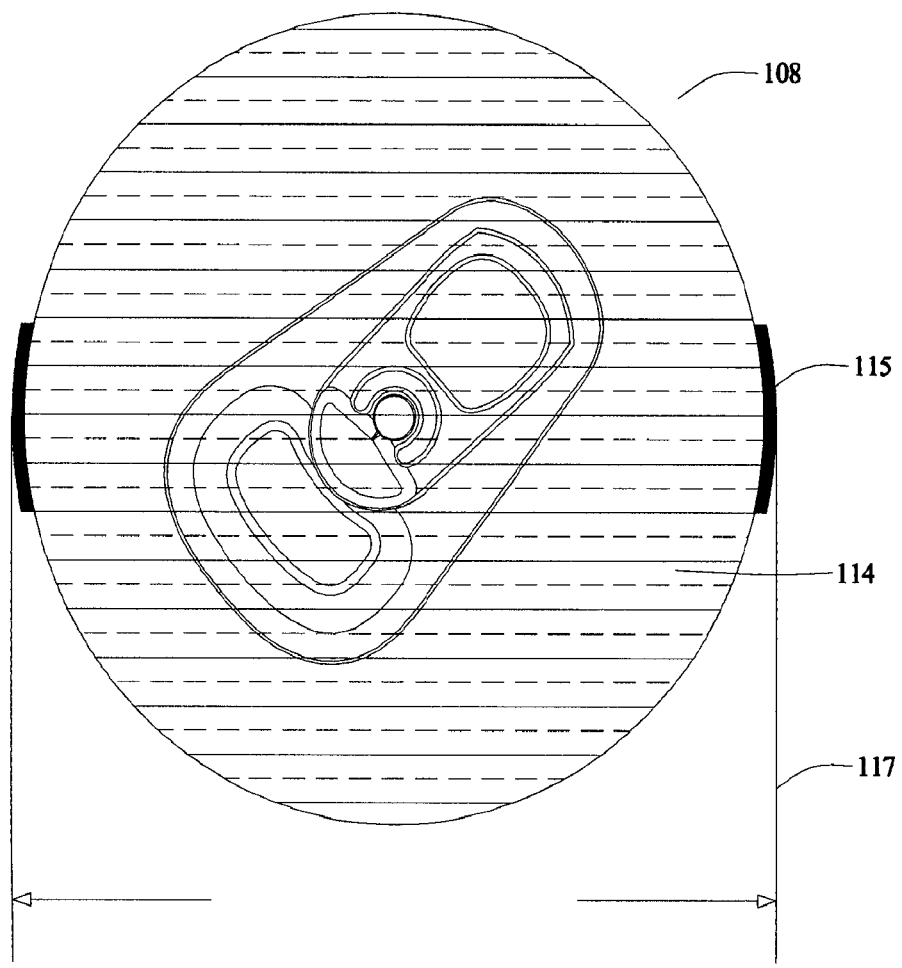
FIGS. 3A through 3C are top view of a container examined using an exemplary method and system for identifying pressure and/or vacuum defects in a container.
Figure 3B:
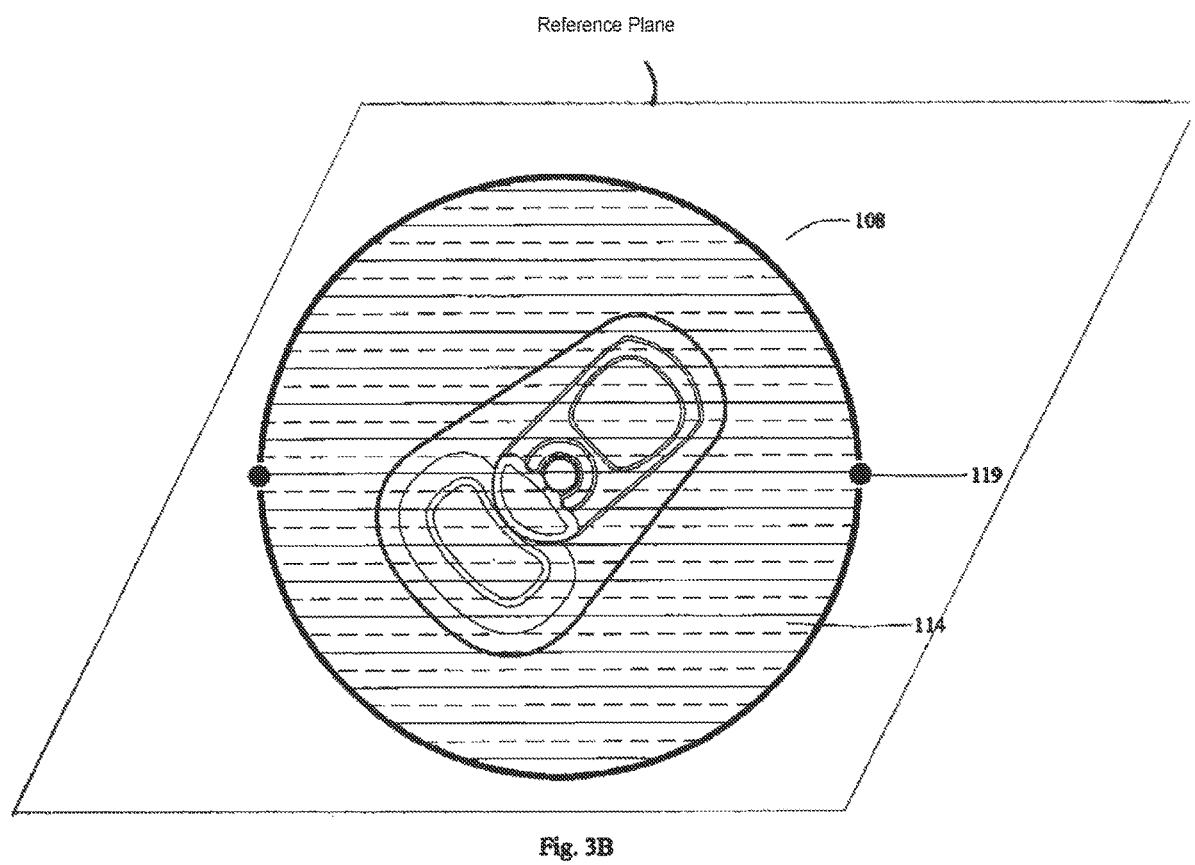
Figure 3C:
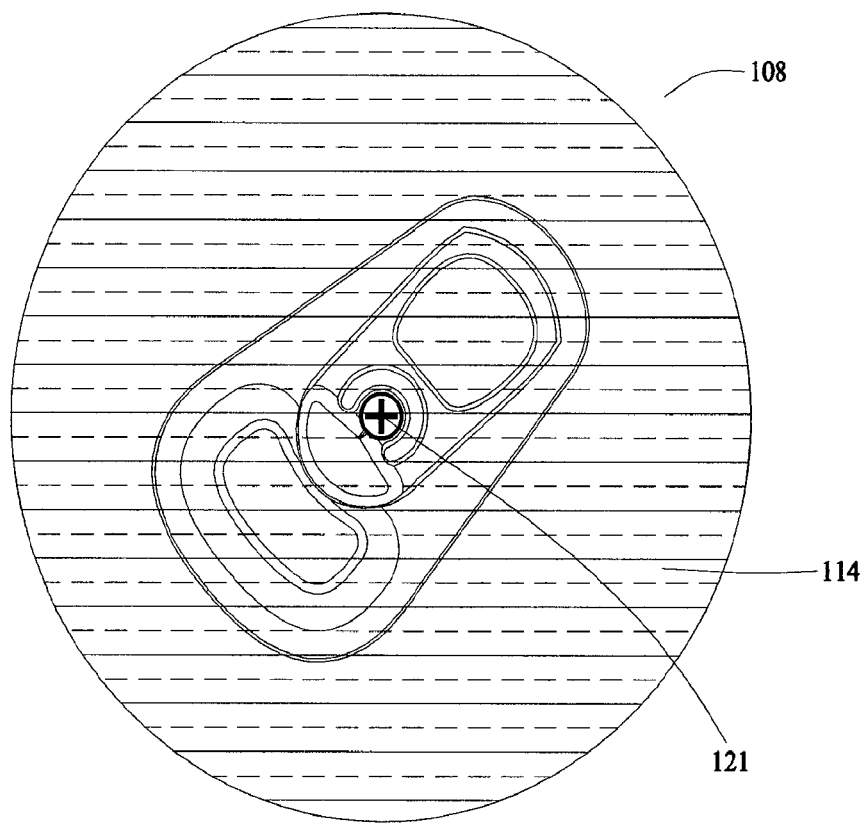
Figure 4A:
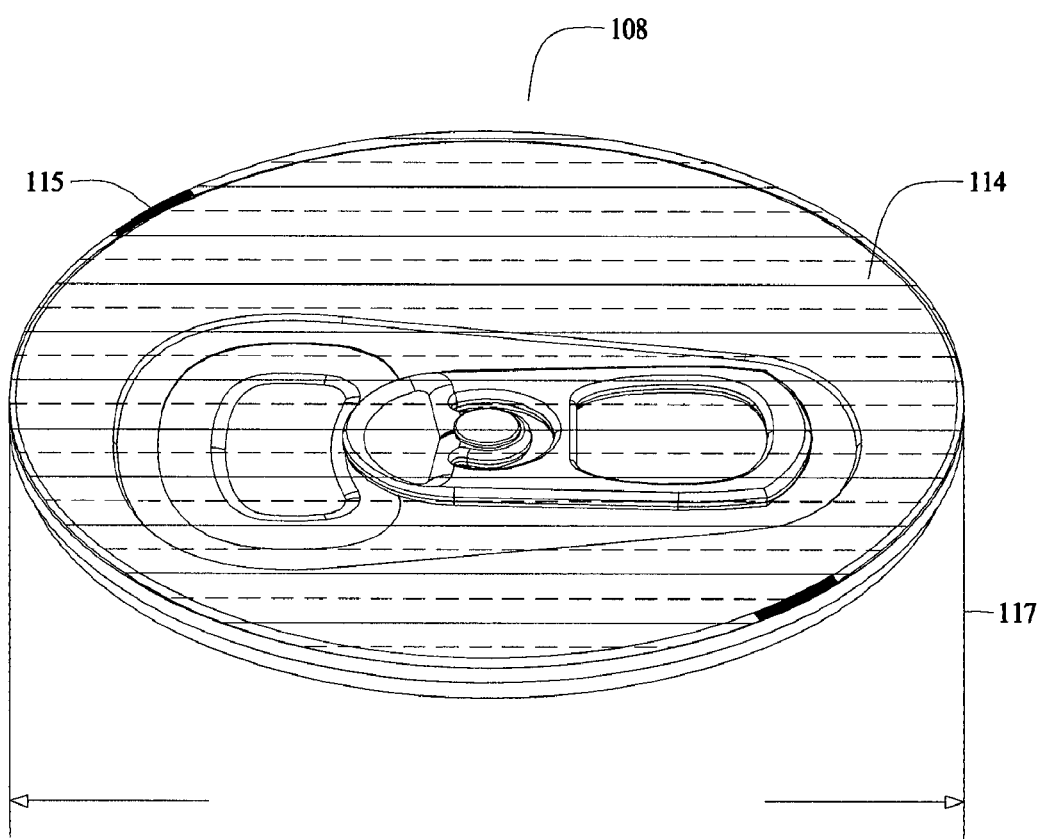
FIGS. 4A through 4C are oblique view of a container examined using an exemplary method and system for identifying pressure and/or vacuum detection.
Figure 4B:
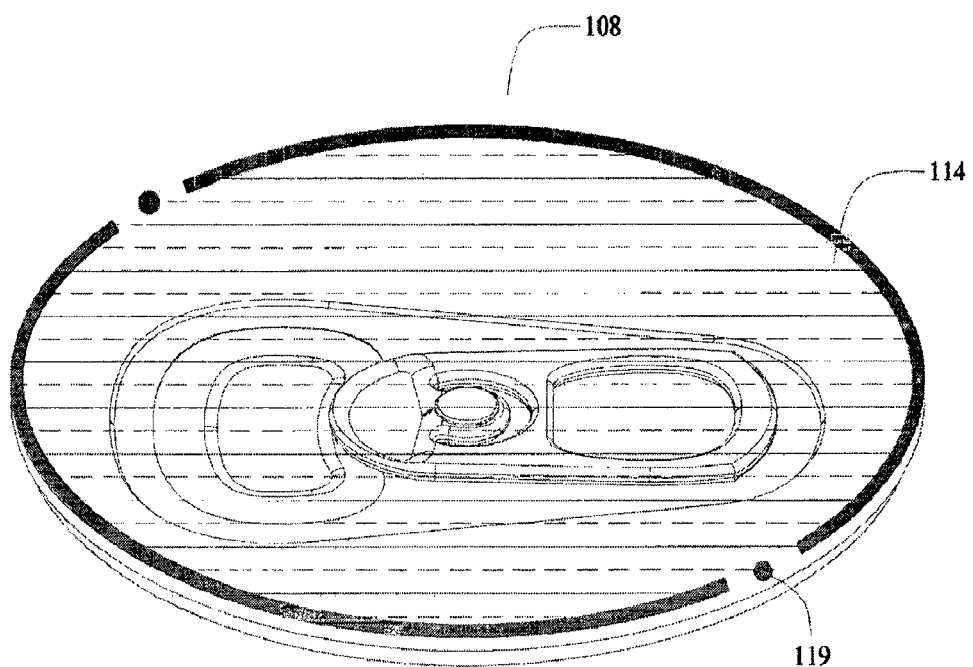
Figure 4C:
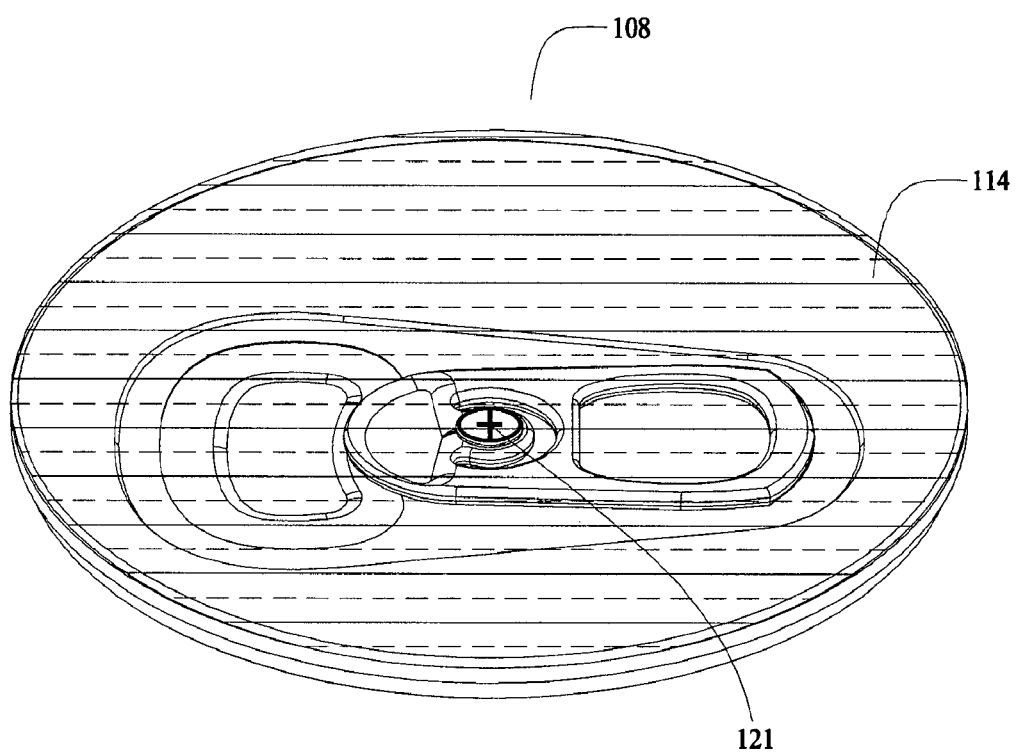

As illustrated in FIGS. 3A, 3B, 3C, 4A, 4B, and 4C, an inspection process includes multiple steps, which may be executed simultaneously or near simultaneously. At the first stage of inspection processing, the outermost edges 115 are detected from container 108. The outermost edges 115 represent the outermost/largest diameter 117 shown in FIG. 3A and FIG. 4A. With that data, the system 100 calculates a circular overlay 119 to fit the largest diameter 117, which establishes the true position of the container 108 independent of the expected position of the container 108 (during transport). A reference plane is developed around the largest diameter 117 and the circular overlay 119 as shown in FIG. 3B and FIG. 4B. Topographical information is read around the circular overlay 119 to develop the reference plane. Once the circular overlay 119 is established, the system 100 calculates the "true center 121" using the topographic information and reads the positional data within the central area of interest as shown in FIG. 3C and FIG. 4C. In this example, the system 100 calculates the height/depth within the central area of interest relative to the reference plane (derived from the edges). The resulting height (at e.g., the "true center") indicates adequate pressure or vacuum in the container. The derived height may then be compared to a standard or standard profile to indicate a defect or lack of a defect in the container.

In other words, these figures show the adaptive construction of the surface of the container 108, including its edges and center. In one example, the images or representations are analyzed using software to determine defects, e.g., by constructing a "center" in substantially real time and determining whether the center is consistent with a defect. The center can be found using the system 100 on the container 108 in typical line conditions, which include slippage and off center positions. Such conditions may result in container 108 being off center by more than ½ inch from its expected position during inspection. The system and method described capture data of large sections of the container 108 and construct the true center and applicable measurement points adaptively, thereby reducing or preventing false rejects, e.g., caused by small imperfections in the physical container 108 or deviation of the container 108 along the conveyor 110.

While a full scan of the container 108 may be desired in some cases, it is not necessary to scan the entire top surface of the container to improve the inspection outcome. In one example, the scan can focus on the region of interest of the container. Bottle caps receive a full scan. It may alternatively be desired to scan a 0.5 to 1 inch series of data to create a reference plan and to analyze accordingly. For example, larger can tops and jar lids may require as little as 0.5 to 1 inch of scan area. In other cases, a partial scan in a section (e.g., the rivet in a can) may be desired.

Figure 5A:
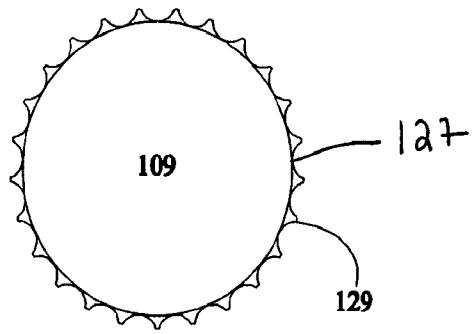
FIGS. 5A through 5C are top view of a container examined using another exemplary method and system for identifying pressure and/or vacuum defects in a container.
Figure 5B:
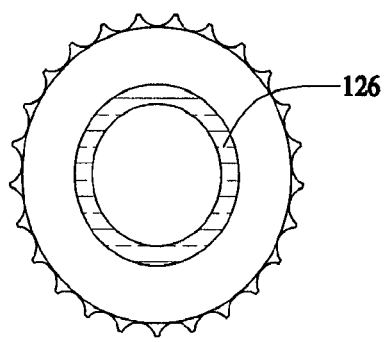
Figure 5C:
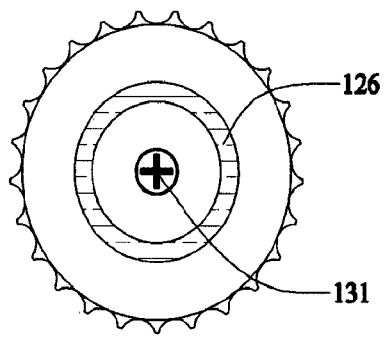

FIGS. 5A, 5B and 5C show the top view of a container examined using another exemplary method and system for identifying pressure and/or vacuum defects in a container that has, e.g., a non-uniform outer edge. As has been illustrated, a reference plane may be developed using data within a containers edges. FIG. 5A shows the top view of an exemplary bottle cap 109 on a container. In this example, the first edges or the outermost edges 129 are detected from cap 109 using the general or approximate exterior edge (e.g., using a "blob"-type of analysis) of the cap 109. The approximation can account for the varied edges along the bottle cap 109. The outer most edges 129 can be approximated to as the outer diameter 127, as shown in FIG. 5A. From this data, the system 100 measures and analyzes data points within a circular donut 126 within edges 125, which provides data to establish the true position of the cap 109 independent of the expected position of the cap 109 (during transport). A reference plane is developed around the circular donut 126 is shown in FIG. 5B. The topographical information is read around the circular donut 126 to develop the reference plane.

Once the circular donut 126 is established, the system 100 calculates the "true center 131" of the topographic information and reads the positional data within the central area of interest shown in FIG. 5C. The system 100 calculates the height/depth within the central area of interest relative to the reference plane (derived from the donut area). The resulting height (at e.g., the "true center") indicates adequate pressure or vacuum in the container. The derived height may then be compared to a standard profile to indicate a defect or lack of a defect in the inspected container.

Another embodiment uses other discernable features to identify and locate reference points and data. This data may be used for analysis and positional correlation. For instance, detection of the profile and orientation of a pull tab may be used to locate the rivet used to attach it. That rivet center can then be used to construct the center of the container. This can then be used to construct a region of interest (i.e., donut) to develop a plane, a reverse derivation of the center point and reference plane described previously.

Another embodiment can employ the use of multiple spectrums of light to collect the data to produce a 3D topographical map of the surface of the container. The optical-camera sensor 106 can be arranged vertically offset relative to conveying direction 116. The optical-camera sensor 106 is disposed such that container surface which is illuminated by the strip-shaped light beams 104 or other patterns can be recorded. The optical-camera sensor 104 comprises one or more cameras, i.e. each camera is connected to processor and in which the images or representations or image data supplied by respective camera are evaluated. An evaluation is done by way of software that can be run in the processor. The processing of the images or representations or image data supplied by camera is effected for example by comparison with nominal data stored in processor. To this extent processor may also be referred to as image processing. A processor is for example a processor or a computer having corresponding inputs for analogue or digital data supplied by the respective camera. Such processor also exhibits outputs (not shown) which are connected to the optical-camera sensor 106 during testing and inspecting the container 108.

In another example, an optical lens 118 can be associated with each camera by way of example only. Optical lens 118 can be configured as a cylindrical lens arranged with its front face to the respective camera. The light beams 104 can be executed as for example laser scanner 102. The light beams can of course also be executed as infrared light source. The light sources can be reflected 112 towards the optical-camera sensor 106 or the optical-camera sensor 106 being synchronized with the light beams 104. In an illustrative embodiment, at least a region of approximately 100% of the top 114 of the container can be recorded by the optical-camera sensor 106. It may be desired that only a portion of the top be recorded by the optical-camera sensor. The optical-camera sensor 106 is of course advantageously horizontally offset relative to the laser scanner 102.

In another embodiment, the system 100 can include use of a single line scanner to create several images or representations, which can be captured as the can/container moves through the scanned area. Each individual image can be then assembled or integrated using software to produce a 3D topographical map of the surface of the container 108. A single laser scanner 102 could also be used to produce a pattern using beam steering techniques such as, but not limited to, piezo or galvanometer mirror steering (similar to laser show effects that project an image on a surface) that can be optimized to a container type, and can be captured and integrated into a single image, this image may be comprised of any number of lines, points, or other mapping that produces a visual map of the surface including orthographic grid patterns, point grids, and other patterns capable of producing a suitable image for area mapping. The use of multiple points or multiple lines can produce improved readings and filter out artifacts or small and insignificant irregularities in the data. Another embodiment can employ the use of multiple spectrums of light to collect the data to produce a 3D topographical map of the surface of the container 108.

The containers can be passed one behind the other on the conveyor 110 for testing and inspecting by the system 100. In other words, the containers can be arranged in a queue on the conveyor 110. The container 108 can be orientated vertically while they pass by the laser scanner 102. The testing and inspecting step can comprise the determination of defective or faulty container 108 by means of the processor is programmed to integrate the positional data and determine whether there are variations, defects or other imperfections on the container 108. The testing and inspecting step can comprise the determination of non-workable containers. Non-workable containers can be, for example, container of a different type or with different positional data or different properties, with respect to the correct or workable container principally with respect to pressure or vacuum of soda cans, jar lids, screw-off caps, foil and plastic seals, and other containers under pressure.

FIG. 6 illustrates one illustrative method. This illustrates a method for reducing false positives or false negatives while inspecting a container having a container surface, includes collecting one or more images or representations of the top surface of a container 200; creating a topographical map of the top of the container surface using data on the surface of the container (e.g., the outer edge of the container) 210, integrating the one or more images or representations using positional data of the container in the images or representations 220; creating a reference plane representing the container surface top 230, measuring the height or depth from the plane at a spot on the container surface top 240, detecting a defect in the container while correcting or discounting extraneous features of the container surface and by comparing the height to an optimal profile 250. The deviation between the height and the optimal profile indicates the defect.

In one illustrative embodiment, a method for testing and inspecting a container 108 with the laser scanner 102 is arranged such that the light beams 104 project a strip-shaped light beams onto the container surface, when the container 108 is passing on a conveyor 110. The light beams 104 illuminate or radiate 112 the top 114 of the container 108 and reflects back to the optical-camera sensor 106. The optical-camera sensor 106 generates digital images or representations of the container surface. As discussed above, the processor is connected to the optical-camera sensor 106; and the positional data of the container 108 is transmitted to the processor. The method of testing and inspecting a container comprises detecting container(s) 108 that exhibit features arranged on a container surface; and integrating the positional data into the processor and determining whether there are variations, defects or other imperfections on the container 108. The method of testing and inspecting can comprise the sorting of defective or faulty and/or non-workable containers. In other words, the method can comprise the determination of variations, defects or other imperfections on the containers and the separation of the faulty container from the usable containers.

Other illustrative embodiments can provide improved and more reliable inspection of the containers because the system can incorporate, account for and adapt to positional changes in the containers by identifying features of a container (e.g. edges, center, circumference, and other pertinent features). The system 100 can integrate the images or representations of the container based on those features and can more accurately determine defects using data incorporating those features. The use of 3D construction can help reduce and overcome the defect in this method caused by container slippage or mis-positioning common in poor or typical conveyor/conveying conditions.

In other illustrative embodiments, the system and method can be used to analyze multiple points or non-central points on the container. For example, the system or the data can be used to construct the dimensions at along the can top or away from the center. In other embodiments, the system or the data can be used to construct multiple images or representations or measure dimensions, e.g., at the center and a point away from the center.

As disclosed there can be one light source to produce reflected light. A plurality of light sources may be employed. Multiple straight line scans, including the use of concentric circles or other shapes or cross hatch patterns may be used to derive the extended data points.

The above described method and system can also be used for testing and inspecting other objects used in the beverage industry. While the illustrative embodiments shown are cylindrical or circular containers, the method and system monitor for defect vacuum and pressure containers without manipulating the containers on the line. These containers may be square, rectangular, oval, or any other shape of containers for food and beverage storage. In these cases, for example, the outer edge may be oval where the container is oval.

The methods and systems processes the data to monitor characteristics such as pressurization and detect conditions such as low pressure, high pressure, vacuum, missing or damaged lids, and bulging containers.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A system for inspecting a container having a top surface using light reflections and positional data, the system comprising:
   a radiation source, the source is arranged such that a light beam projects radiation onto the top surface, wherein the radiation radiates along an outer edge of the container;
   a sensor, wherein the sensor is configured to collect radiation reflected from the container using positional data; and
   a processor operatively connected to the sensor, the processor integrates the positional data to detect defects in the container
   wherein the processor is configured to calculate a circular overlay to fit a largest diameter represented by an outer edge of the container and to create employing topographical information read around the circular overlay, a reference plane of the top surface of the container, to read the positional data within a central area of the top surface and to calculate a height within the central area relative to the reference plane using positional data, the sensor captures the positional data of the container as the container moves on a conveyor; and the positional data is integrated using software to produce a 3D topographical map of the container to allow inspection of the container.

2. The system of claim 1, wherein the sensor includes one or more cameras and an optical lens associated with the camera.

3. The system of claim 1, further comprising a conveyor in which the container moves thereon, wherein the camera is arranged vertically above the conveyor with angle of inclination less than 90°.

4. The system of claim 3, wherein the container passes under the radiation source and the sensor captures a series of line profiles of the container and the profiles are processed by the processor.

5. The system of claim 4, wherein the radiation source is a laser scanner that is used to produce a pattern using piezo or galvanometer mirror steering.

6. The system of claim 1, wherein the height is compared to standard data corresponding to a desired profile.

7. A method for inspecting a container having a container surface, the method comprising:
   collecting one or more images of the container surface top;
   creating a topographical information of the top of the container surface by reading topographical information around a circular overlay calculated to fit a largest diameter of the outer edge of the container;
   integrating the one or more images using positional data of the container in the images;
   creating a reference plane representing the container surface top using the topographical information;
   measuring a height from the plane at a spot on the container surface from the reference plane using the positional data;
   detecting a defect in the container while correcting or discounting extraneous features of the container surface with respect to position of the container and by comparing the height to profile, wherein a deviation between the height and the profile indicates the defect.

8. The method of claim 7, wherein collecting the one or more images of the container surface comprising using a laser scanner, wherein using the laser scanner includes use of a single line scanner to create several images, which can be captured as the containers passes through a scanned area.

9. The method of claim 8, wherein collecting the one or more images of the container surface comprising using a laser scanner, wherein the laser scanner is configured to create several representations of the container surface; and the representations are integrated using software to produce a 3D topographical map of the container surface.

10. The method of claim 8, wherein the positional data is used to construct dimensions of the top of the container, while correcting or discounting any extraneous features of the container surface, wherein the height or depth at the center of the container with respect to the reference plane indicate variations, defects or other imperfections in the container, including pressure defects.

11. The method of claim 7, wherein collecting the one or more images of the container surface comprising using a laser scanner, wherein the laser scanner is used to produce a pattern using piezo or galvanometer mirror steering.

12. The method of claim 7, wherein the positional data is used to construct the dimension at the approximate center of the container surface.

* * * * *